(12) United States Patent
Deng et al.

(10) Patent No.: US 12,177,155 B2
(45) Date of Patent: Dec. 24, 2024

(54) METHOD FOR FLEXIBLE FEEDBACK IN V2X TRANSMISSION AND USER EQUIPMENT

(71) Applicant: SPREADTRUM COMMUNICATIONS (SHANGHAI) CO., LTD., Shanghai (CN)

(72) Inventors: Yun Deng, Shanghai (CN); Lifeng Han, Shanghai (CN); Xiangxin Gu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 621 days.

(21) Appl. No.: 17/244,100

(22) Filed: Apr. 29, 2021

(65) Prior Publication Data

US 2021/0273767 A1    Sep. 2, 2021

Related U.S. Application Data

(63) Continuation of application No. PCT/CN2019/104357, filed on Sep. 4, 2019.

(30) Foreign Application Priority Data

Oct. 31, 2018 (CN) .......................... 201811286597.5

(51) Int. Cl.
*H04L 5/00* (2006.01)
*H04W 4/40* (2018.01)
*H04W 72/0453* (2023.01)

(52) U.S. Cl.
CPC ............. *H04L 5/0055* (2013.01); *H04W 4/40* (2018.02); *H04W 72/0453* (2013.01)

(58) Field of Classification Search
CPC ....... H04L 5/0055; H04L 1/1664; H04L 5/16; H04L 1/1854; H04L 1/1864;
(Continued)

(56) References Cited

U.S. PATENT DOCUMENTS

| 2017/0171879 A1 | 6/2017 | Jiang et al. |
| 2017/0215183 A1* | 7/2017 | Gulati .................. H04L 1/1896 |
| 2020/0008234 A1* | 1/2020 | Li ....................... H04W 72/044 |

FOREIGN PATENT DOCUMENTS

| CN | 102740477 A | 10/2012 |
| CN | 103178942 A | 6/2013 |

(Continued)

OTHER PUBLICATIONS

International Search Report issued in corresponding International Application No. PCT/CN2019/104357, mailed Nov. 28, 2019, 10 pages.
(Continued)

*Primary Examiner* — Dady Chery
(74) *Attorney, Agent, or Firm* — HAUPTMAN HAM, LLP

(57) ABSTRACT

A method for flexible feedback in V2X transmission, and a user equipment are provided. The method implemented in a receiving UE (user equipment) includes the following. A feedback requirement indicated by a transmitting UE is received during V2X transmission. A feedback resource is determined according to the feedback requirement. Feedback information is sent to the transmitting UE on the feedback resource according to the feedback requirement. The method implemented in a transmitting UE includes the following. A feedback requirement is indicated to a receiving UE during V2X transmission. Feedback information sent by the receiving UE on a feedback resource according to the feedback requirement is received, where the feedback
(Continued)

resource is determined by the receiving UE according to the feedback requirement.

13 Claims, 2 Drawing Sheets

(58) Field of Classification Search
CPC ... H04L 1/1896; H04L 5/0005; H04L 5/0033; H04L 5/0064; H04L 5/0091; H04L 1/1861; H04L 1/1607; H04W 4/40; H04W 72/0453
See application file for complete search history.

(56) References Cited

FOREIGN PATENT DOCUMENTS

| | | | |
|---|---|---|---|
| CN | 106954272 A | 7/2017 | |
| CN | 107371182 A | 11/2017 | |
| CN | 108616339 A | 10/2018 | |
| CN | 108632781 A | 10/2018 | |
| CN | 108702257 A | 10/2018 | |
| WO | 2018/021819 A1 | 2/2018 | |
| WO | 2018166607 A1 | 9/2018 | |
| WO | 2018171540 A1 | 9/2018 | |

OTHER PUBLICATIONS

First Office Action issued in corresponding CN Application No. CN201811286597.5, mailed Apr. 6, 2021, 17 pages.
Ericsson, "On the Support of HARQ/CSI feedbacks Over Sidelink," 3GPP TSG-RAN WG2 #103-Bis, TDoc R2-1815041, Chengdu, China, Oct. 8-12, 2018, 3 pages.
Interdigital Inc., "QoS Management for NR V2X," 3GPP RAN WG2 Meeting #103bis, R2-1814018, Chengdu, China, Oct. 8-12, 2018, 5 pages.
Catt, "Support of unicast, groupcast and broadcast in NR sidelink", 3GPP TSG RAN1 Meeting #94, R1-1808399, Gothenburg, Sweden, Aug. 20-24, 2018, 4 pages.
Charter Communications, "HARQ Feedback Enhancements," 3GPP TSG RAN WG1 Meeting #94BIS, R1-1811322, Chengdu, P. R. China, Oct. 8-12, 2018, 2 pages.
Xiaomi Communications, "On support of HARQ for V2x communications," 3GPP TSG RAN WG1 Meeting #94bis, R1-1811420, Chengdu, China, Oct. 8-12, 2018, 2 pages.
First Office Action issued in corresponding IN Application No. 202147023175, mailed Feb. 23, 2022, p. 1-6.
Extended European Search Report issued in corresponding EP Application No. EP19880001.3, mailed Jun. 8, 2022.
Fujitsu: "Considerations on unicast, groupcast and broadcast for NR V2X", 3GPP Draft; R1-1810589 Considerations on Imocast, Groupcast and Broadcast for NR V2X, 3rd Generation Partnership Project (3GPP), Mobile Competece Centre; 650, Route Des Lucioles: F-06921. SOPHIA-ANT vol. TAN WG1, No. Chengdu, China; Oct. 8, 2018-Oct. 12, 2018, Sep. 28, 2018 (Sep. 28, 2018), XP051517996, Retrieved from the Internet: URL:http://www.3gpp.org/ftp/tsg%5Fran/WG1%5FRL1/TSGR1%5F94b/Docs/R1%2D1810589%2Ezip [retrieved on Sep. 28, 2018].
Spreadtrum Communications: "Discussion on sidelink physical layer structures and procedure(s)", 3GPP Draft; R1-1811010 Discussion on Sidelink Physical Layer Structures and Procedure(S)_Final, 3rd Generation Partnership Project (3GPP), Mobile Competece Centre; 650, Route Des Lucioles; F-06921 vol. RAN WG1, No. Chengdu, China, Oct. 8, 2018-Oct. 12, 2018, Sep. 29, 2018 (Sep. 29, 2018), XP051518414, Retrieved from the Internet: URL:http://www.3gpp.org/ftp/tsg%5Fran/WG1%5FRL1/TSGR1%5F94b/Docs/R1%201811010%2Ezip [retrieved on Sep. 29, 2018].

* cited by examiner

METHOD FOR FLEXIBLE FEEDBACK IN V2X TRANSMISSION AND USER EQUIPMENT

CROSS-REFERENCE TO RELATED APPLICATION(S)

This application is a continuation of International Application No. PCT/CN2019/104357, filed on Sep. 4, 2019, which claims priority to Chinese Patent Application No. 201811286597.5, filed on Oct. 31, 2018, the entire disclosures of which are hereby incorporated by reference.

TECHNICAL FIELD

This disclosure relates to the technical field of wireless communication, and particular to a method and a device for flexible feedback in V2X transmission, and a user equipment.

BACKGROUND

In Release 12, ProSe (proximity-based service) direct communication is introduced in LIE (long term evolution). UE (user equipment) A and UE B (or multiple UEs) can perform direct communication through the PC5 interface. The PC5 interface is the direct interface between UEs.

There are two modes for resource allocation. One is the scheduled resource allocation, which is configured by a base station through dedicated signaling. The other is the autonomous resource selection. In this case, the base station can provide a resource pool for direct communication to the UE through system messages or RRC (radio resource control) signaling, so that the UE can select a resource(s) for direct communication from the resource pool. If the transmitter UE is not within the coverage of the network (i.e., the network coverage), the UE adopts the autonomous resource selection to select a transmission resource for direct communication from a pre-configured resource pool.

Based on direct communication, 3GPP (3rd generation partnership project) also supports V2X. Within the network coverage, a UE can send V2X messages to multiple UEs. It is to be noted, both the receiving UE and the transmitting UE may not be within the network coverage or some UEs may be within the network coverage.

Currently, 3GPP is studying introduction of V2X to 5G (i.e., new radio, NR). This is because 5G can provide greater bandwidth and lower latency, and can better meet a service requirement of V2X. Furthermore, 3GPP has also agreed that NR V2X can adopt unicast, groupcast, or broadcast to transmit V2X services. When the transmitting UE adopts unicast or groupcast, feedback can be introduced. However, how to perform V2X feedback according to a service requirement of the transmitting UE is a problem to be solved.

SUMMARY

A method and a device for flexible feedback in V2X transmission, and a user equipment are provided, to implement flexible feedback while a service requirement of a transmitting UE is met.

According to a first aspect, a method for flexible feedback in V2X transmission is provided. The method is implemented in a receiving UE and includes the following.

A feedback requirement indicated by a transmitting UE is received during V2X transmission.

A feedback resource is determined according to the feedback requirement.

Feedback information is sent to the transmitting UE on the feedback resource according to the feedback requirement.

In at least one implementation, the feedback requirement indicated by the transmitting UE is received as follows. The feedback requirement indicated by the transmitting UE is received through SCI (sidelink control information). Alternatively, the feedback requirement indicated by the transmitting UE is received through a MAC (medium access control) header carried by a PSSCH (physical sidelink shared channel) during transmission of V2X data.

In at least one implementation, the feedback requirement includes one or more of the following parameters: feedback type, feedback delay, feedback reliability, feed back at the same frequency or not, whether the feedback information can be embedded into V2X data, and a time slot in which feedback is not allowed.

In at least one implementation, the feedback requirement is in the form of an index and different indexes correspond to different feedback requirements.

In at least one implementation, the feedback resource is determined according to the feedback requirement as follows.

The feedback resource is selected from a feedback resource pool according to the feedback requirement.

Alternatively, a feedback resource acquisition request is sent to a base station when the receiving UE is in connection and the feedback resource configured by the base station according to the feedback requirement is received, where the feedback requirement is indicated in the feedback resource acquisition request.

In at least one implementation, the feedback resource pool is allocated by a serving cell where the receiving UE is located, or the feedback resource pool is set by a pre-configured parameter when the receiving UE is outside the network coverage.

According to a second aspect, a method for flexible feedback in V2X transmission is provided. The method is implemented in a transmitting UE and includes the following.

A feedback requirement is indicated to a receiving UE during V2X transmission.

Feedback information sent by the receiving UE on a feedback resource according to the feedback requirement is received, where the feedback resource is determined by the receiving UE according to the feedback requirement.

In at least one implementation, the method further includes the following, after the feedback information sent by the receiving UE on the feedback resource according to the feedback requirement is received.

The feedback information is indicated to a base station when the transmitting UE is in connection.

In at least one implementation, the feedback information is indicated to the base station as follows. NACK (negative acknowledgement) information is indicated to the base station. Alternatively, the feedback information is indicated to the base station through a buffer status report.

According to a third aspect, a receiving UE is provided. The receiving UE includes at least one processor, a transceiver, and a memory. The memory stores instructions which, when executed by the at least one processor, cause the at least one processor to perform the method of the first aspect.

DETAILED DESCRIPTION

Technical solutions in implementations of the disclosure will be described clearly and completely hereinafter with reference to the accompanying drawings described. Apparently, the described implementations are merely some rather than all implementations of the disclosure. All other implementations obtained by those of ordinary skill in the art based on the implementations of the disclosure without creative efforts shall fall within the protection scope of the disclosure.

Figure 1:
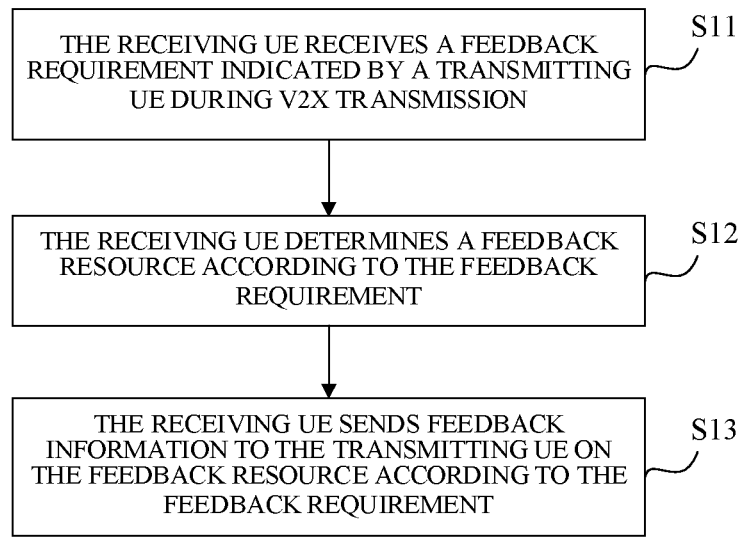
FIG. 1 is a schematic flow chart illustrating a method for flexible feedback in V2X transmission according to implementations.

Implementations provide a method for flexible feedback in V2X transmission. The method is implemented in a receiving UE. As illustrated in FIG. 1, the method begins at S11.

At S11, the receiving UE receives a feedback requirement indicated by a transmitting UE during V2X transmission.

At S12, the receiving UE determines a feedback resource according to the feedback requirement.

At S13, the receiving UE sends feedback information to the transmitting UE on the feedback resource according to the feedback requirement.

According to the method for flexible feedback in V2X transmission, during V2X transmission, the receiving UE receives the feedback requirement indicated by the transmitting UE, determines the feedback resource according to the feedback requirement, and sends the feedback information to the transmitting UE on the feedback resource according to the feedback requirement. As such, the receiving UE can flexibly select a time-frequency resource for feedback while a service requirement of the transmitting UE is met, to implement flexible feedback.

Figure 2:
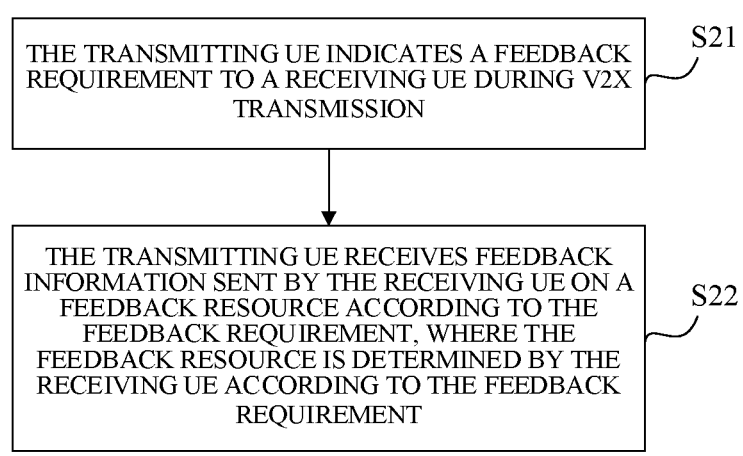
FIG. 2 is a schematic flow chart illustrating a method for flexible feedback in V2X transmission according to other implementations.

Implementations further provide a method for flexible feedback in V2X transmission. The method is implemented in a transmitting UE. As illustrated in FIG. 2, the method begins at S21.

At S21, the transmitting UE indicates a feedback requirement to a receiving UE during V2X transmission.

At S22, the transmitting UE receives feedback information sent by the receiving UE on a feedback resource according to the feedback requirement, where the feedback resource is determined by the receiving UE according to the feedback requirement.

According to the method for flexible feedback in V2X transmission, during V2X transmission, the transmitting UE indicates the feedback requirement to the receiving UE and receives the feedback information sent by the receiving UE on the feedback resource according to the feedback requirement, where the feedback resource is determined by the receiving UE according to the feedback requirement. As such, the receiving UE can flexibly select a time-frequency resource for feedback while the service requirement of the transmitting UE is met, to implement flexible feedback.

In 5G, it has not been determined whether the direct interface between UEs still uses the PC5 interface. For simplicity, herein, the PC5 interface refers to a direct interface between UEs, physical layer control signaling transmitted through the PC5 interface is called SCI, and V2X data transmitted through the direct interface is on PSSCH.

The following describes the method for flexible feedback in V2X transmission of the implementations in detail.

In the implementation, UE A as the transmitting end and UE B as the receiving end support 5G V2X. In the implementation, unicast is used for description. Further, groupcast is applicable. In the case of groupcast, there can be one or more receiving UEs, and for each UE, the following scheme is adopted.

UE A located in serving Cell 1 expects to send V2X data (or V2X service) to surrounding UE B. UE B may be located in serving Cell 1, or in a neighboring cell, or not within the network coverage.

UE A can detect that UE B is nearby through network assistance or through direct discovery, and then can perform V2X transmission.

UE A may request a transmission resource for sending V2X services from Cell 1 or may select a transmission resource for sending V2X services from a resource pool broadcast in the system message of Cell 1. When UE A transmits V2X services to UE B, the V2X services generally contain SCI and data on PSSCH. The SCI indicates a transmission resource occupied by the V2X data on PSSCH and other information. The SCI may also indicate information that UE B needs to feedback after receiving the V2X data.

To achieve flexible feedback, when a feedback requirement is needed, UE A needs to indicate the feedback requirement to UE B. The feedback requirement may include at least one or more of the following parameters.

1. HARQ (hybrid automatic repeat request) feedback type, for example, one-to-one feedback or one-to-many feedback. That is, feed back each time V2X data transmitted on PSSCH is received, or feed back once when multiple V2X data transmitted on PSSCH (in the same time slot or different time slots) are received. In the case of one-to-many feedback, specific values can be set, such as one-to-three feedback or up to one-to-four feedback.

2. Feedback delay, such as the latest feedback time. Alternatively, a time duration is set, from the beginning of a time slot after V2X data is received to the end of a time slot.

3. Feedback reliability. Whether to feed back multiple times, that is, for one V2X transmission, feed back once or multiple times; or for multiple transmissions of the same V2X data packet, feed back once or multiple times.

4. Feed back at the same frequency or not, whether a frequency at which feedback is transmitted is the same as a frequency at which V2X data is received.

5. Whether the feedback information can be embedded into V2X data. UE B may send the V2X data to UE A and the V2X data is transmitted over PSSCH. Some resource elements (RE) on PSSCH can be used to transmit feedback information and other REs can be used to transmit the V2X data.

6. A time slot in which feedback is not allowed (or is limited). Due to limitation of half-duplex of transmission and reception, it is necessary to know the time slot in which feedback is not allowed. The transmitting UE needs to perform V2X transmission or may perform uplink transmission in these time slots where feedback is not allowed, resulting in failure of reception of feedback. Therefore, the time slot in which feedback is not allowed can be set, so that the transmitting UE can receive the feedback information.

UE B can obtain the feedback requirement from the received SCI or the corresponding PSSCH. If the feedback requirement is transmitted through the SCI, a new cell needs to be introduced into the SCI to indicate one or more parameters in the feedback requirement. Alternatively, the feedback requirement is transmitted through PSSCH. In this case, the SCI indicates that the V2X data is transmitted on the PSSCH, along with a MAC header during transmission of the V2X data packet. For example, a MAC header of several bytes is introduced to indicate one or more parameters in the feedback requirement.

Due to various feedback requirements on feedback type, feedback delay, feedback reliability, there may be many related parameters. A table can be set (for example, preset in the agreement), where each index in the table corresponds to different feedback requirements and each feedback requirement defined in the table may include part or all of the above parameters. The following illustrates a table where the feedback requirement is in the form of an index.

| index | feedback type | feedback delay | reliability |
|---|---|---|---|
| 0 | one-to-three feedback | the maximum is 20 ms | once |
| 1 | one-to-many feedback | [2 ms, 15 ms] | twice |
| 2 | one-to-three feedback | the maximum is 5 ms | once |
| 3 | one-to-three feedback | the maximum is 2 ms | once |

In this way, the feedback requirement can be indicated by using a smaller number of bits, which can be conveniently indicated in the SCI or the MAC header. UE A and UE B agree on the form and contents of the table in advance. After receiving an index indicated in the SCI or the MAC header, UE B queries the table according to the index to obtain a feedback requirement of UE A. It is to be noted that, different V2X services have different quality of service (QoS) parameters and the QoS indicates delay and reliability of the V2X service. The current QoS can be expanded to include the feedback requirement. For example, if a feedback requirement demanded by a QoS is a feedback requirement indicated by index 1 in the above table, UE A only needs to indicate the QoS parameter to UE B in the SCI or the MAC header, to indicate the feedback requirement.

UE B knows a receiving resource pool needed for receiving V2X services through the system message, in a cell where UE B resides, or uses a pre-configured resource pool to receive V2X services when UE B is outside the network coverage. By receiving the V2X services, UE B receives the feedback requirement from UE A, for example, receives a corresponding index and then selects an appropriate resource from a feedback resource pool to transmit feedback.

The feedback resource pool is allocated by a serving cell where UE B is located, or the feedback resource pool is set by a pre-configured parameter when UE B is outside the network coverage. UE B selects an appropriate resource from the feedback resource pool and transmit feedback according to the received feedback requirement.

For example, UE B determines that the index is 2. According to the above table, UE B knows that feedback type is one-to-one feedback and needs to complete the feedback within 5 ms after receiving the V2X data. UE B selects a transmission resource that can complete the feedback within 5 ms from the feedback resource pool and determines timing of the feedback. If the feedback requirement indicated by UE A also include information that indicates to perform feedback at the same frequency, UE B only performs feedback at the received frequency.

Because UE A has set the feedback requirement, UE A can receive the expected feedback information in a suitable window, thereby improving accuracy of the feedback information and ensuring transmission of the V2X services.

In addition to ACK (acknowledgement)/NACK, the feedback information sent by UE B to UE A may include information such as the identity of the UE transmitting the V2X data, the identity of the receiving UE, and the sequence number of the receiving the V2X data.

In an example, UE B sends V2X data to UE A. In this case, UE B obtains a resource pool for transmitting the V2X data from the serving cell and obtains a feedback resource pool from the serving cell, where the two resource pools may be different or the same.

In an example, when UE A and UE B are in different cells, UE A sends V2X data to UE B and indicates to UE B that UE A needs feedback.

As the receiving UE, UE B obtains the feedback requirement from the PC5 interface.

When UE B is in connection, UE B can request a feedback resource from a base station through the Uu interface and inform the base station of the feedback requirement, so that the base station can allocate the feedback resource. If a cycle of a resource occupied by UE A transmitting V2X data can be known from the SCI sent by UE A, UE B can also indicate the cycle, so that the base station periodically allocates the feedback resource.

The base station can allocate a dedicated feedback resource to UE B and allocation of the feedback resource needs to meet the feedback requirement. For example, if the feedback needs to be completed within 5 ms at the latest, UE B needs to indicate a time limit for resource allocation to the base station. Considering time delay of signaling interaction between the UE B and the base station and processing time delay of UE B and the base station, the time limit for resource allocation indicated by UE B to the base station will be less than 5 ms.

If UE B knows period information of subsequent V2X transmission and persistent information in each period from the SCI sent by UE A, UE B can indicate the information to the base station, so that the base station can better configure the dedicated feedback resource.

In an example, the base station may configure a dedicated feedback resource pool for UE B and let UE B select a feedback resource from the dedicated feedback resource pool.

After UE A receives the feedback information from UE B, if UE A is in connection and UE A uses a dedicated resource allocated by the base station (that is, the base station that serves UE A) to transmit V2X data, UE A needs to send the received feedback information to the base station, so that the base station can reasonably allocate a transmission resource and a retransmission resource. In an example, UE A may only send the received NACK information to the base station. This is because UE A needs to retransmit unsuccessfully transmitted V2X data. The base station needs to reasonably allocate the transmission resource, so that UE A can not only retransmit the unsuccessfully transmitted V2X data but also timely transmit new V2X data to-be-transmitted.

In an example, UE A can indicate the feedback information to the base station through a buffer status report, so that the base station can reasonably allocate a transmission resource and a retransmission resource. UE A can trigger a buffer status report after receiving the NACK information sent by UE B, so that the base station knows the size of V2X data that UE A needs to transmit. When a transmission resource for UE A to send V2X data to UE B is allocated by the base station, the base station can know the size of V2X data that UE A can transmit in one successful transmission. As such, the remaining amount of V2X data can be inferred according to the buffer status report of V2X data previously reported by UE A, so that transmission resource allocation can be done reasonably. However, when UE A does not successfully transmit V2X data, that is, receives the NACK information fed back by UE B, the base station has no idea that V2X data buffered by UE A is not reduced. If the base station allocates a transmission resource according to the original strategy, UE A may not be able to transmit V2X data in time. Therefore, UE A needs to indicate the buffer status report of V2X data to the base station when receiving the NACK information from UE B.

Figure 3:
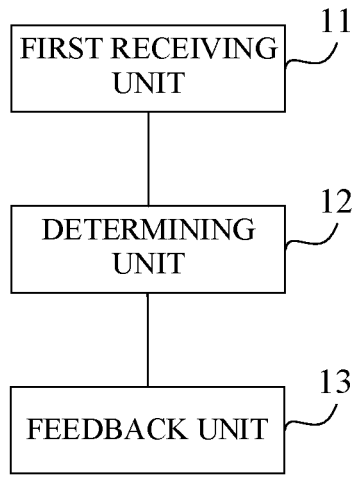
FIG. 3 is a schematic structural diagram illustrating a device for flexible feedback in V2X transmission according to implementations.

Implementations further provide a device for flexible feedback in V2X transmission. The device is implemented in a receiving UE. As illustrated in FIG. 3, the device includes a first receiving unit 11, a determining unit 12, and a feedback unit 13.

The first receiving unit 11 is configured to receive a feedback requirement indicated by a transmitting UE during V2X transmission.

The determining unit 12 is configured to determine a feedback resource according to the feedback requirement.

The feedback unit 13 is configured to send feedback information to the transmitting UE on the feedback resource according to the feedback requirement.

According to the device for flexible feedback in V2X transmission, during V2X transmission, the receiving UE receives the feedback requirement indicated by the transmitting UE, determines the feedback resource according to the feedback requirement, and sends the feedback information to the transmitting UE on the feedback resource according to the feedback requirement. As such, the receiving UE can flexibly select a time-frequency resource for feedback while a service requirement of the transmitting UE is met, to implement flexible feedback.

In at least one implementation, the first receiving unit 11 is configured to: receive the feedback requirement indicated by the transmitting UE through SCI; or receive the feedback requirement indicated by the transmitting UE through a MAC header carried by a PSSCH during transmission of V2X data.

In at least one implementation, the feedback requirement includes one or more of the following parameters: feedback type, feedback delay, feedback reliability, feed back at the same frequency or not, whether the feedback information can be embedded into V2X data, and a time slot in which feedback is not allowed.

In at least one implementation, the feedback requirement is in the form of an index and different indexes correspond to different feedback requirements.

In at least one implementation, the determining unit 12 is configured to: select the feedback resource from a feedback resource pool according to the feedback requirement; or send a feedback resource acquisition request to a base station when the receiving UE is in connection and receive the feedback resource configured by the base station according to the feedback requirement, where the feedback requirement is indicated in the feedback resource acquisition request.

In at least one implementation, the feedback resource pool is allocated by a serving cell where the receiving UE is located, or the feedback resource pool is set by a pre-configured parameter when the receiving UE is outside the network coverage.

The device of the implementation can be used to implement the technical solutions of the foregoing method implementations implemented in the receiving UE and its principles and technical effects are similar, which will not be repeated herein.

Figure 4:
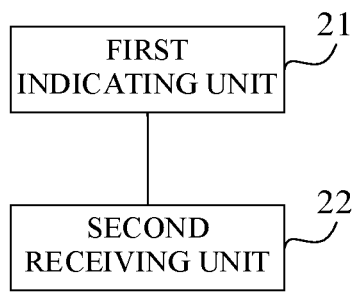
FIG. 4 is a schematic structural diagram illustrating a device for flexible feedback in V2X transmission according to other implementations.

Implementations further provide a device for flexible feedback in V2X transmission. The device is implemented in a transmitting UE. As illustrated in FIG. 4, the device includes a first indicating unit 21 and a second receiving unit 22.

The first indicating unit 21 is configured to indicate a feedback requirement to a receiving UE during V2X transmission.

The second receiving unit 22 is configured to receive feedback information sent by the receiving UE on a feedback resource according to the feedback requirement, where the feedback resource is determined by the receiving UE according to the feedback requirement.

According to the device for flexible feedback in V2X transmission, during V2X transmission, the transmitting UE indicates the feedback requirement to the receiving UE and receives the feedback information sent by the receiving UE on the feedback resource according to the feedback requirement, where the feedback resource is determined by the receiving UE according to the feedback requirement. As such, the receiving UE can flexibly select a time-frequency resource for feedback while the service requirement of the transmitting UE is met, to implement flexible feedback.

In at least one implementation, the device further includes a second indicating unit. The second indicating unit is configured to indicate the feedback information to a base station when the transmitting UE is in connection, after the second receiving unit receives the feedback information sent by the receiving UE on the feedback resource according to the feedback requirement.

In at least one implementation, the second indicating unit is configured to: indicate NACK information to the base station; or indicate the feedback information to the base station through a buffer status report.

The device of the implementation can be used to implement the technical solutions of the foregoing method implementations implemented in the transmitting UE and its principles and technical effects are similar, which will not be repeated herein.

Implementations further provide a user equipment. The user equipment includes the device for flexible feedback in V2X transmission at the receiving UE or at the transmitting UE.

Figure 5:
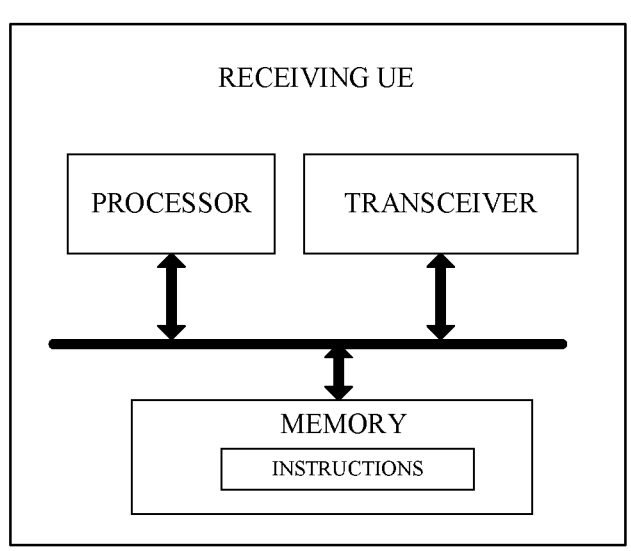
FIG. 5 is a schematic structural diagram illustrating a receiving UE according to implementations.

Implementations further provide a receiving UE. As illustrated in FIG. 5, the receiving UE includes at least one processor, a transceiver, and a memory. The memory stores instructions which, when executed by the at least one processor, cause the at least one processor to perform the above method implemented in the receiving UE.

It should be noted that those of ordinary skill in the art may understand that all or part of the operations in the methods described in the foregoing implementations may be implemented by a computer program instructing hardware. The program may be stored in a computer readable storage medium. When executed, the above method can be performed. The storage medium may include a magnetic disk, an optical disk, a read only memory (ROM), a random access memory (RAM), or the like.

The above are some implementations of the disclosure, but the protection scope of the disclosure is not limited thereto. Any changes or substitutions that can be easily conceived by those skilled in the art within the technical scope disclosed by the disclosure should be covered by the protection scope of the disclosure. Therefore, the protection scope of the disclosure should be subject to the protection scope of the claims.

What is claimed is:

1. A method for flexible feedback in V2X (vehicle-to-everything) transmission, implemented in a receiving UE (user equipment) and comprising:
   receiving a requirement for feedback indicated by a transmitting UE through SCI (sidelink control information);
   selecting a feedback resource from a feedback resource pool, wherein the feedback resource pool is obtained through system information or is a pre-configured feedback resource pool; and
   sending feedback information to the transmitting UE on the feedback resource according to the requirement for feedback, wherein the feedback information is to be indicated by the transmitting UE to a base station when the transmitting UE is in connection.

2. The method of claim 1, wherein the requirement for feedback comprises one or more of the following parameters: feedback type, feedback delay, feedback reliability, feed back at the same frequency or not, whether the feedback information can be embedded into V2X data, and a time slot in which feedback is not allowed.

3. The method of claim 2, wherein the requirement for feedback is in the form of an index and different indexes correspond to different requirements for feedback.

4. The method of claim 1, further comprising:
   sending a feedback resource acquisition request to a base station when the receiving UE is in connection and receiving the feedback resource configured by the base station according to the requirement for feedback, wherein the requirement for feedback is indicated in the feedback resource acquisition request.

5. The method of claim 1, wherein the feedback resource pool is allocated by a serving cell where the receiving UE is located, or the feedback resource pool is set by a pre-configured parameter when the receiving UE is outside the network coverage.

6. A method for flexible feedback in V2X (vehicle-to-everything) transmission, implemented in a transmitting UE (user equipment) and comprising:
   indicating a requirement for feedback to a receiving UE through SCI (sidelink control information);
   receiving feedback information sent by the receiving UE on a feedback resource according to the requirement for feedback, wherein the feedback resource is selected by the receiving UE from a feedback resource pool, and the feedback resource pool is obtained through system information or is a pre-configured feedback resource pool; and
   indicating the feedback information to a base station when the transmitting UE is in connection.

7. The method of claim 6, wherein indicating the feedback information to the base station comprises:
   indicating NACK (negative acknowledgement) information to the base station; or
   indicating the feedback information to the base station through a buffer status report.

8. A receiving UE (user equipment), comprising:
   at least one processor;
   a transceiver; and
   a memory storing instructions which, when executed by the at least one processor, cause the at least one processor to:
   receive, via the transceiver, a requirement for feedback indicated by a transmitting UE through SCI (sidelink control information);
   select a feedback resource from a feedback resource pool, wherein the feedback resource pool is obtained through system information or is a pre-configured feedback resource pool; and
   send, via the transceiver, feedback information to the transmitting UE on the feedback resource according to the requirement for feedback, wherein the feedback information is to be indicated by the transmitting UE to a base station when the transmitting UE is in connection.

9. The receiving UE of claim 8, wherein the requirement for feedback comprises one or more of the following parameters: feedback type, feedback delay, feedback reliability, feed back at the same frequency or not, whether the feedback information can be embedded into V2X data, and a time slot in which feedback is not allowed.

10. The receiving UE of claim 9, wherein the requirement for feedback is in the form of an index and different indexes correspond to different requirements for feedback.

11. The receiving UE of claim 8, wherein the at least one processor is further configured to:
    send, via the transceiver, a feedback resource acquisition request to a base station when the receiving UE is in connection and receive, via the transceiver, the feedback resource configured by the base station according to the requirement for feedback, wherein the requirement for feedback is indicated in the feedback resource acquisition request.

12. The receiving UE of claim 8, wherein the feedback resource pool is allocated by a serving cell where the receiving UE is located.

13. The receiving UE of claim 8, wherein the feedback resource pool is set by a pre-configured parameter when the receiving UE is outside the network coverage.

* * * * *